(12) United States Patent
Ganesamoorthi et al.

(10) Patent No.: US 7,929,441 B1
(45) Date of Patent: Apr. 19, 2011

(54) RESOURCE RESERVATION METHOD AND SYSTEM

(75) Inventors: Sai Suresh Ganesamoorthi, San Jose, CA (US); Prashant Chauhan, Sunnyvale, CA (US); Somnath Roy, Santa Clara, CA (US); Balaji Krishnamoorthy, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 2372 days.

(21) Appl. No.: 10/645,921

(22) Filed: Aug. 20, 2003

(51) Int. Cl.
*H04L 12/28* (2006.01)
(52) U.S. Cl. ............... 370/235; 370/395.41; 370/401; 709/226
(58) Field of Classification Search .............. 370/235, 370/237, 229, 230.1, 252, 395.4–395.41, 370/401; 709/226
See application file for complete search history.

(56) References Cited

U.S. PATENT DOCUMENTS

| | | | | |
|---|---|---|---|---|
| 4,974,256 A * | 11/1990 | Cyr et al. | | 379/112.04 |
| 5,920,621 A * | 7/1999 | Gottlieb | | 379/112.01 |
| 6,070,192 A * | 5/2000 | Holt et al. | | 709/227 |
| 6,240,086 B1 * | 5/2001 | Morgan et al. | | 370/352 |
| 6,278,712 B1 | 8/2001 | Takihiro et al. | | |
| 6,381,238 B1 * | 4/2002 | Hluchyj | | 370/352 |
| 6,535,505 B1 * | 3/2003 | Hwang et al. | | 370/352 |
| 6,600,740 B1 * | 7/2003 | Valentine et al. | | 370/365 |
| 6,603,774 B1 * | 8/2003 | Knappe et al. | | 370/466 |
| 6,665,293 B2 * | 12/2003 | Thornton et al. | | 370/352 |
| 6,754,181 B1 * | 6/2004 | Elliott et al. | | 370/252 |
| 6,785,741 B1 * | 8/2004 | Mandalia et al. | | 719/328 |
| 6,798,745 B1 * | 9/2004 | Feinberg | | 370/235 |
| 6,928,482 B1 * | 8/2005 | Ben Nun et al. | | 709/235 |
| 6,975,625 B1 * | 12/2005 | Groenendaal | | 370/356 |
| 6,996,615 B1 * | 2/2006 | McGuire | | 709/226 |
| 7,058,046 B2 * | 6/2006 | Celi et al. | | 370/352 |
| 7,099,301 B1 * | 8/2006 | Sheu | | 370/352 |
| 7,140,016 B2 * | 11/2006 | Milovanovic et al. | | 718/100 |
| 7,426,182 B1 * | 9/2008 | Wang et al. | | 370/235 |
| 2002/0191768 A1 * | 12/2002 | Stoughton | | 379/219 |
| 2003/0067918 A1 * | 4/2003 | DeMars | | 370/392 |
| 2006/0053424 A1 * | 3/2006 | Koistinen et al. | | 718/105 |

OTHER PUBLICATIONS

Document by Cisco Systems, Inc. *Understanding High Density Voice Network Modules*, Aug. 13, 2002.
Document by Cisco Systems, Inc. *Release Notes for the Cisco ICS 7750 for System Software Release 1.0.x*, Apr. 30, 2001.
Prior U.S. Appl. No. 10/231,783, filed Aug. 28, 2002.

* cited by examiner

*Primary Examiner* — William Trost, IV
*Assistant Examiner* — Roberta A Shand
(74) *Attorney, Agent, or Firm* — Marger Johnson & McCollom, P.C.

(57) ABSTRACT

A method and system of assigning DSP resources in a voice gateway which first seeks to assign the calls to DSPs on a best fit basis using information in a best fit (BF) pool. If a call can not be assigned on a BF basis, the call is assigned to a DSP based on information in a load balancing (LB) pool. The BF pool indicates which DSPs will be completely loaded by calls using various codecs and which DSPs have calls that have a first channel penalty (FCP). The LB pool indicates the number of calls each DSP is handling.

19 Claims, 7 Drawing Sheets

Figure 4 Initialization

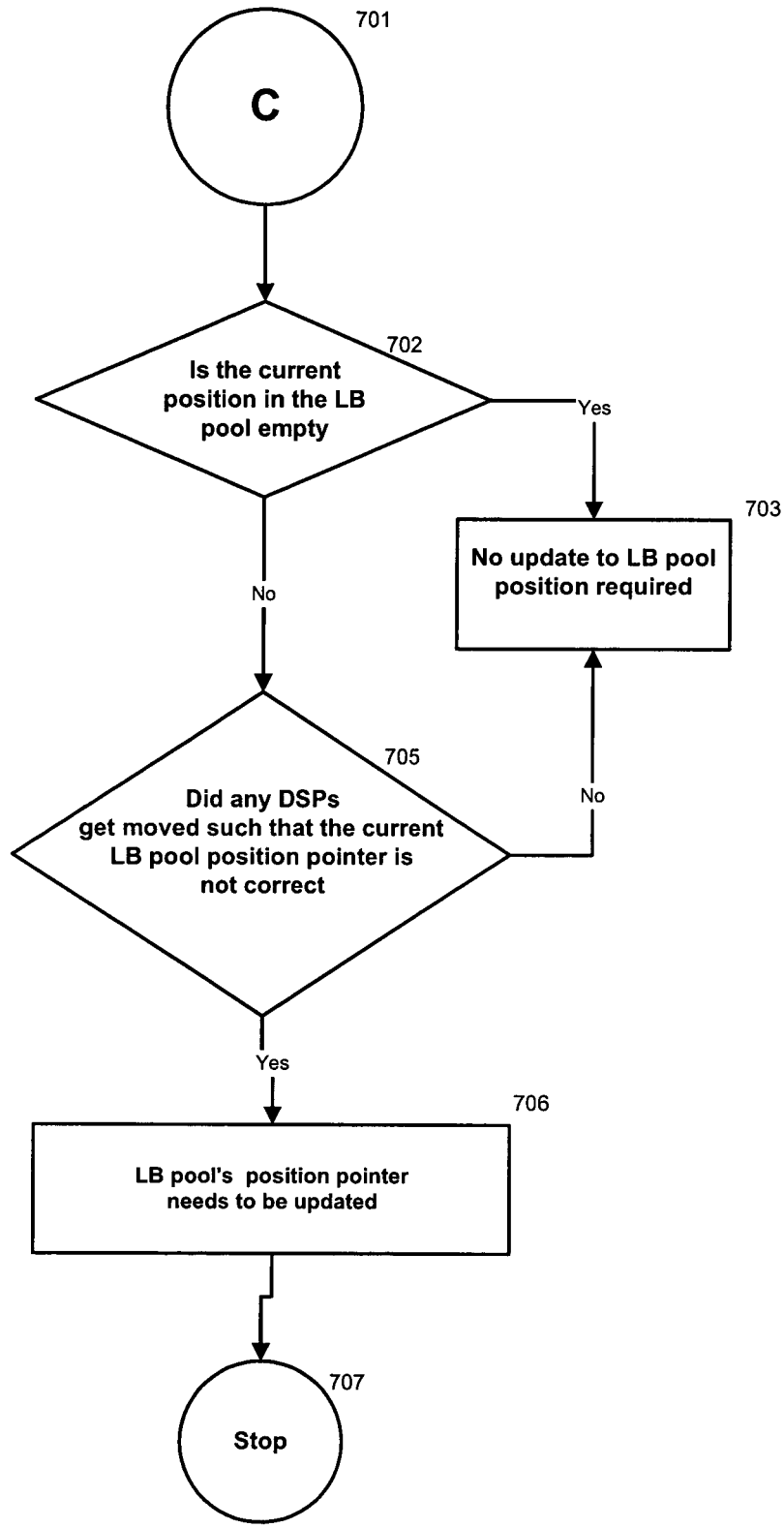

RESOURCE RESERVATION METHOD AND SYSTEM

FIELD OF THE INVENTION

This invention relates to electronic systems and more particularly to electronic systems that receive tasks and which assign these tasks to resources in the system.

BACKGROUND OF THE INVENTION

Abbreviations used herein:

| | |
|---|---|
| TDM | Time Division Multiplexing |
| ATM | Asynchronous Transfer Mode |
| IP | Internet Protocol |
| DSP | Digital Signal Processor |
| LB | Load Balancing |
| BF | Best Fit |
| FCP | First Channel Penalty |
| CCD | Clear Channel Codec |

A voice gateway is an example of the type of device that must assign tasks to resources. Voice gateways are devices that convert voice TDM signals to packets. Voice gateways receive information from call agents. Call agents setup voice and data calls on the voice gateways. A voice gateway converts TDM signals in the incoming call to IP packets in one direction and it does the opposite in the reverse direction. The call agents communicate with the voice gateway using a protocol such as MGCP or H.248 typically over an IP network. The call agent generally provides the voice gateway with information concerning which codec should be used for each particular call. Voice gateways and call agents are in widespread use.

Voice gateways typically include a plurality of DSPs. The DSPs are programmed to terminate TDM voice calls and convert the raw voice data into IP or ATM packets. The DSPs converts each call using the particular codec specified by the call agent. One DSP can generally handle a plurality of voice channels and a voice gateway generally includes a number of DSPs. The amount of resources used by a DSP to handle a particular call depends upon the codec specified for that call. For optimum operation it is desirable to assign calls to the various DSPs such that the DSPs in the unit are equally loaded; however, there are also other considerations that can be taken into account when assigning resources to calls.

In the prior art a number of different techniques have been used to assign calls to DSPs in a voice gateway. In one technique the available capacity of each DSP is tracked and when a new call arrives, a search is made through a series of data structures to find a channel for the incoming call. Ideally an algorithm should perform suitably under a variety of conditions such as under both high and low load conditions.

SUMMARY OF THE PRESENT INVENTION

The present invention provides a method and system for allocating resources to tasks as they arise, in an environment where (1) there are a number of resources, each capable of handling a number of tasks and (2) the tasks require differing amount of resources. First an attempt is made to assign resources on a best fit basis. If assignment on a best fit basis can not be accomplished, the resources are assigned on a load balancing basis. That is, assignment is first made on a best fit basis if there is a resource that only has the amount of resources available that matches the resource required by the task at hand or if there is some other consideration that makes a particular resource the best resource for the task at hand. If there is no resource that provides a match on a best fit basis, a task is assigned on a load balancing basis.

In the embodiment described in detail herein, the invention is applied to assigning DSP resources to handle codecs in a voice gateway. With the present invention, two pools of DSPs are created. The first pool is a Load Balancing pool (hereinafter referred to as LB pool). Each entry in this pool indicates the DSPs that are handling a particular number of calls. For example, one entry could indicate all of the DSPs that are handling eight calls at a particular time. The number of entries in this pool is equal to the maximum number of calls that can be handled by a single DSP. Initially all DSPs in the system are placed in the 0th entry of the LB pool.

The second pool is a Best Fit Pool (hereinafter referred to as the BF pool). The BF pool indicates those DSPs that have just enough capacity left to handle one particular type of codec or that are a best fit due to the existence of a FCP. In the BF pool the codecs that require a particular amount of resources are grouped. Each group is called a codec resource group. All the codecs in each codec resource group utilize approximately the same amount of DSP resource and the codecs in each resource group have the same FCP if any. As the term is used herein two codecs have the same FCP if a particular DSP handling a call with one of the codecs will not suffer another FCP if another call is handled by the particular DSP using either of the two codecs.

The BF pool has an entry (that is a sub pool) for each codec resource group. Each entry in this pool indicates the DSPs that have just enough resources available to handle the resources required by the particular codec resource group or which are handling a call with a FCP of the codecs in the resource group. The resource groups in the BF pool are arranged in order of the amount of resources used by the codecs in the various groups. For example, the first entry in the BF pool gives the list of DSPs that have enough resources to handle codecs in the resource group that requires the largest amount of DSP resources. The second entry give the DSPs that have just enough resources to handle codecs requiring the second most resources.

When a call is received, the codec required by the call is determined and the BF pool is interrogated to determine if there is a DSP in the entry for the codec resource group to which this codec is assigned. If there is an entry in the BF pool for the particular call (i.e. the resource group to which the codec belongs), that DSP is used to process the call. If there is no entry in the BF pool for the particular codec, the LB pool is interrogated to determine which DSP should be used.

BRIEF DESCRIPTION OF THE FIGURES

FIG. 7 is a block flow diagram showing the updating of LB pools position.

DETAILED DESCRIPTION

Figure 1:
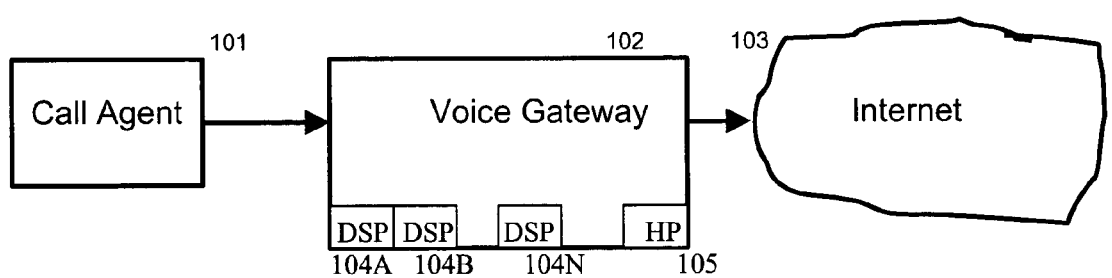
FIG. 1 is an overall system diagram.

An overall block diagram of a first embodiment of the invention is shown in FIG. 1. As shown in FIG. 1, call agent 101 sends commands to the voice gateway 102 indicating how the call should be set up. After the call is set up, the call itself is sent to the voice gateway 102 which in turn forms and passes packets to the interne 103. Call agent 101 is conventional, and it passes calls to voice gateway 102 using a standard protocol. Call agents connected to voice gateways are in relatively widespread use. Protocols for connecting call agents to voice gateways are known in the art. Examples of such protocols are the protocols known as MGCP and H.248.

As is conventional, the voice gateway 102 includes a number of DSPs 104A to 104N. The DSPs 104A to 104N use a codec designated by call agent 101 to generate packets which are sent to the internet 103. The exact number of DSPs in a particular voice gateway is a matter of design choice depending on the capacity desired. The voice gateway 102 also includes a host processor 105 (designated HP in FIG. 1). The host processor 105 handles the call setup, that is, the steps whereby a DSP is assigned to a particular call to execute the codec required by the particular call.

It is noted that, as is conventional in the art, each DSP is capable of simultaneously processing a plurality of calls. Furthermore, it is noted that the various codecs, specified by call agent 101 each may require a different amount of DSP resources. That is, some codecs require a large amount of DSP resources and other codecs require relatively little DSP resources. The codecs specified by call agent 101 can for example be non-compression codecs such as the codecs known as G711, CCD, etc. Alternatively the codecs can be compression codecs such as the codec known as G729, G726, G723, etc. The DSPs in voice gateway 102 also perform other standard functions such as echo cancellation voice activity detection, input/output gain, etc.

The typical yardsticks that are often used to measure the performance of a voice gateway are "supported density" and "supported call rates". In general the supported call rate is proportional to the speed of the software in the voice gateway. One of the important components of the voice gateway software is the DSP resource management software. The DSP resource management software keeps track of the available DSP resources and allocates a DSP channel to each incoming call. The effectiveness of any DSP resource management software is determined by how fast the algorithm works under no-load as well as under high load conditions. That is, how effectively the resource management software utilizes the resources available and how effectively it shares the call load on all the DSPs.

The preferred embodiment of the invention described herein provides a method and system for resource management in a voice gateway. That is, the preferred embodiment described herein provides a method and system which allocates and assigns calls to specific DSPs in voice gateway 102.

Figure 2:
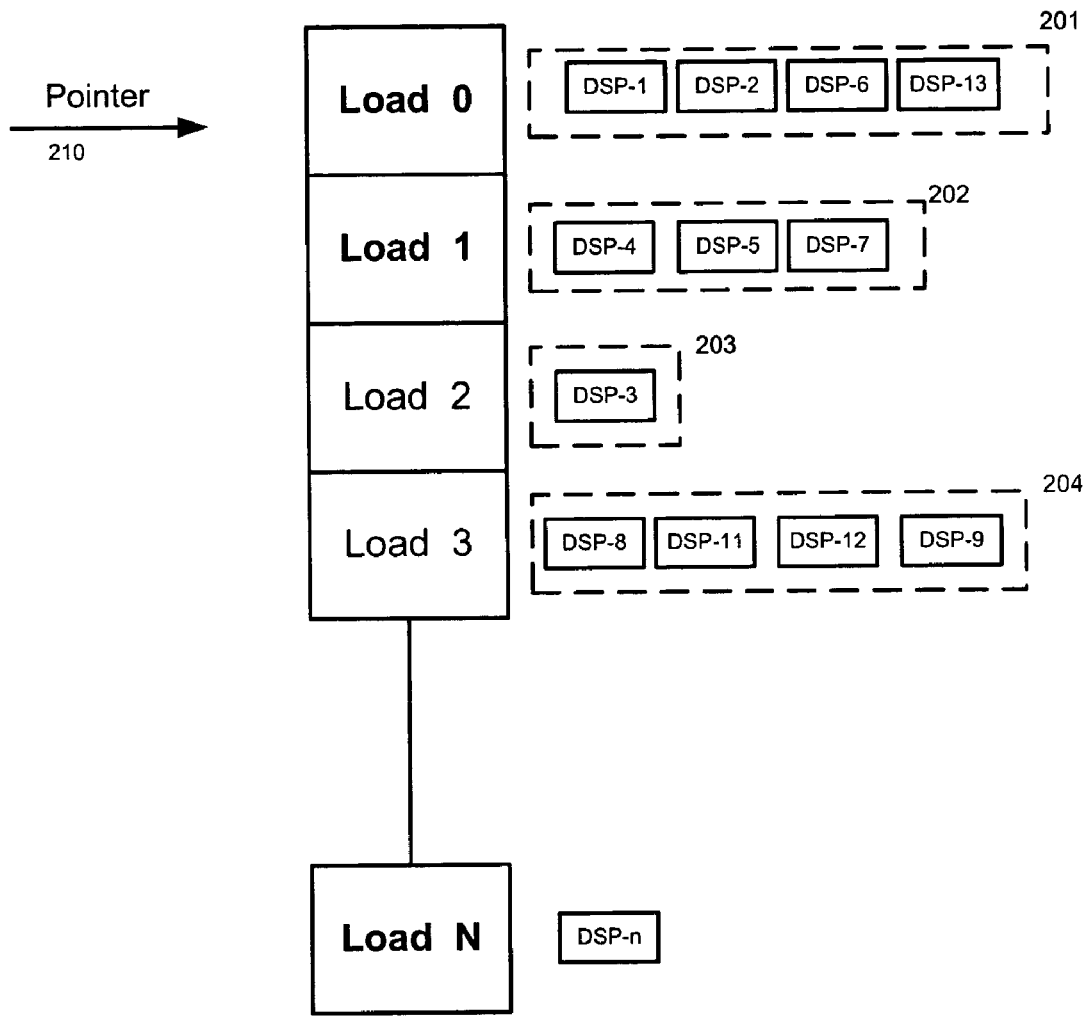
FIG. 2 is a block diagram illustrating the LB pool.

Two pools are used. The first pool is a Load Balancing pool (referred to as the LB pool) and is illustrated in FIG. 2. Each entry in the LB pool indicates the DSPs (as indicated by 201-204) that are handling a particular number of calls. For example, in the illustration given in FIG. 2, the entry labeled "load 3" indicates the four DSPs 204 each of which is handling three calls at that particular time. The number of entries in this pool is equal to the maximum number of calls that can be handled by a single DSP. Initially all DSPs in the system are placed in the 0th entry of the LB pool. A pointer 210 is maintained. This pointer always points to the entry that indicates the DSPs which have the lightest (lowest) load.

Figure 3:
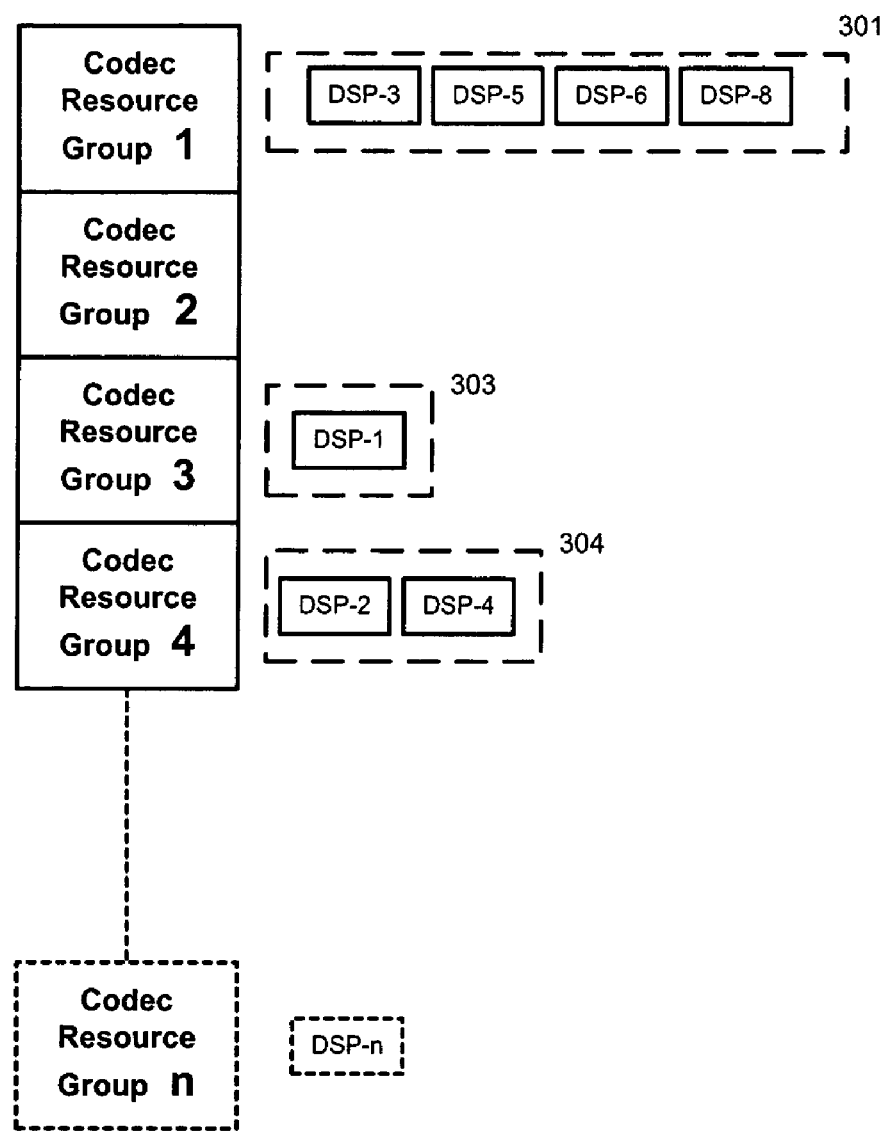
FIG. 3 is a block diagram illustrating the BF pool.

The second pool is a Best Fit Pool (hereinafter referred to as the BF pool). The BF pool is illustrated in FIG. 3. In the BF pool, the codecs are grouped. Each group is called a codec resource group. A codec is placed in a particular resource group based on the particular amount of resources required by the codec or based on the existence of a first channel penalty (i.e. a FCP). All the codecs placed in a codec resource group utilize approximately the same amount of DSP resources and if applicable have the same FCP. The BF pool has one entry for each codec resource group.

The entries in the BF pool will first be explained ignoring the issues related to FCP. Considerations related to FCP will be explained later. Ignoring issues related to FCP, each entry in the BF pool indicates the DSPs that have just enough resources available to handle the resources required by a codec in the particular codec resource group (as indicated by 301, 303, and 304). The number of entries in the BF pool equals the number of different resource groups of codecs, where the codecs in each resource group use approximately the same amount of resources. For example, in the specific embodiment shown, the codecs are divided into four resource groups. The codecs in each resource group utilize approximately the same amount of resources. Each particular entry in the BF pool lists or indicates the DSPs that have only enough remaining resources to handle the resources required by the codecs in one particular resource group. Codecs in codec resource group 1 require the largest amount of resources and codecs in codec resource group 4 require the least amount of resources. For example in the illustration shown in FIG. 3, DSPs 2 and 4 only have enough resources to handle the codecs in codec resource group 4. The number of entries in the BF pool is equal to the number of codec resource groups into which the codecs used in the particular system fall.

It should be noted that the entries shown in FIGS. 2 and 3 are solely for the purpose of illustration. In any operating system the actual entries in the pools change over time. It should also be noted that in actual practice a resource pool is a data construct which tabulates or stores certain information.

A DSP is moved from the LB pool to the BF pool when the DSP has just enough resources remaining such that the particular DSP can only handle one more codec or when a DSP is handling a call one more codec or when a DSP is handling a call with a FCP of the codecs in one of the resource groups. When a DSP is moved to the BF pool it is placed in the highest possible resource group depending on the amount of capacity remaining in the particular DSP (or when moved due to a FCP it is placed where appropriate for the FCP). For example, let us assume that a DSP is handling three calls and that a fourth call is assigned to the DSP based upon the DSP's position in the LB pool. Let us assume that after the fourth call is assigned to the particular DSP, that DSP only has enough resources left to handle a codec that is in codec resource group 2. In this situation the DSP will be moved from the LB pool to the group 2 position in the BF pool.

In addition to placing DSPs in the BF pool based on the amount of resources remaining in a DSP as explained above, it should be noted that a DSP can also be placed in a particular resource group, based on a FCP. That is, if a DSP is processing a codec which has a FCP, the DSP is placed in the BF pool in a resource group for codecs that have this particular FCP. When codecs are grouped into resource groups, the existence of FCPs is taken into account. All of the codecs in a particular resource group must be codecs that will not incur a second FCP if they are executed on a DSP which was placed in the BF pool because the DSP was executing a codec with a particular FCP.

As illustrated in FIG. 3, there are four resource groups in the BF pool. However, the dotted lines are intended to indicate that in other embodiments, there could be as many resource groups as are required by the particular implementation. It should be understood that FIG. 3 is merely an example and in any system the DSPs that are in the BF pool change over time.

FIGS. 4 to 7 are block flow diagrams illustrating the operation of the invention. The operations shown in FIGS. 4 to 7 are performed by a program running on host processor 105 in FIG. 1.

Figure 4:
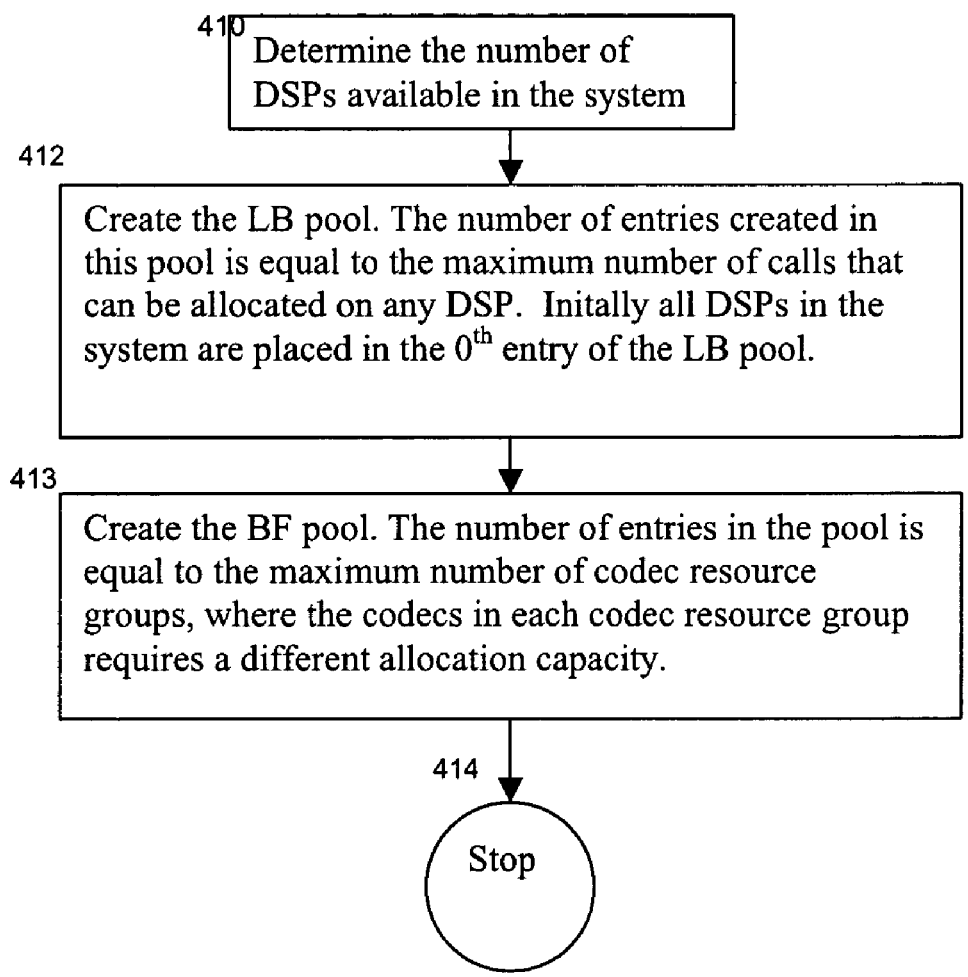
FIG. 4 is a block flow diagram showing process initialization.

FIG. 4 shows the initialization process where the structure of the LB pool and the BF pool are formed. As indicated by block 410, the system must determine the number of available DSPs and the capacity of the DSPs. A determination must also be made concerning which codecs the system will be designed to handle, the resources required by these codecs and which codecs have a FCP.

As indicated by block 412 the LB pool is created with a number of entries equal to the maximum number of calls that can be allocated on any DSP. In any embodiment this will depend on the capacity of the DSPs that are used and on the codecs that the system is designed to handle. Initially, all DSPs in the system are placed in the "0"th entry of the LB pool since all of the DSPs are handling "0" calls.

As indicated by block 413, a BF pool is also created. The number of entries in the BF pool is equal to the maximum number of codec resource groups, where the codecs in each codec resource group requires different allocation of DSP capacity. That is, the codecs which the system will handle are divided into codec resource groups. Each codec resource group only contains codecs that require the same amount of resources. Furthermore, all of the codecs in each codec resource group are subject to the same FCP. Naturally other normal types of initialization is are also done at system initialization.

Figure 5:
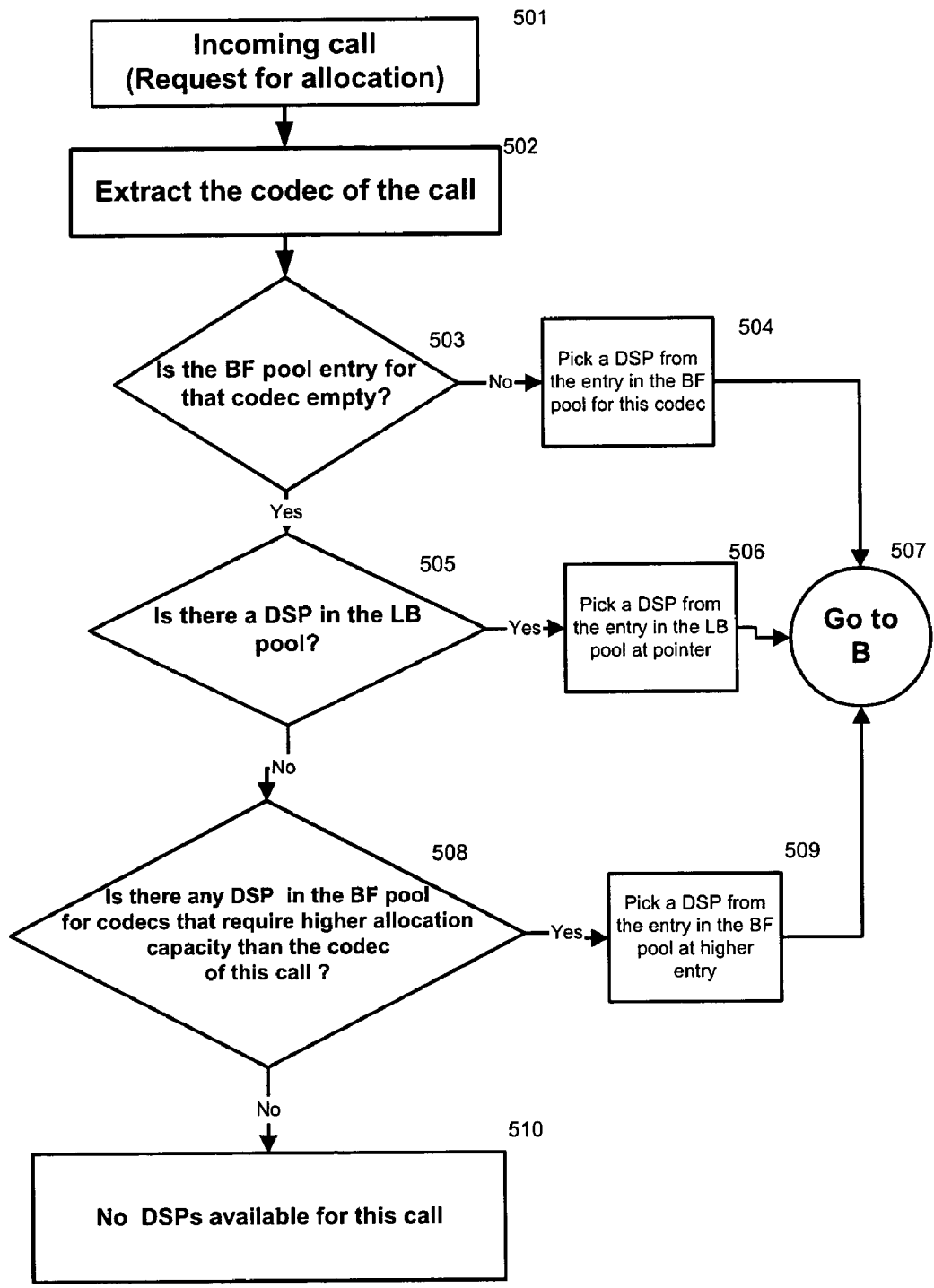
FIG. 5 is a block flow diagram showing how a DSP is selected.

FIG. 5 is a block diagram of the program that selects a DSP for use by a particular call. As indicated by block 501 an incoming call triggers a request to allocate a DSP to the particular call. A determination is made as to what codec is being used as indicated by block 502.

As indicated by block 503, an initial inquiry is made to determine if there is a DSP in the BF pool entry for the resource group that includes the codec specified for this particular call. It is noted that initially, there will be no DSPs in the BF pool. However, as the system becomes loaded, DSPs will appear in the BF pool. The steps through which a DSP gets into the BF pool will be explained below.

If there is a DSP in the BF pool entry for the resource group that includes the codec specified by a particular call, one of these DSPs is selected as indicated by block 504. Thus, a DSP will be selected to handle the call, and that DSP will have just enough resources to handle this particular codec. If there are multiple entries anyone of the DSPs can be picked randomly; however, in order to increase speed, the first DSP in the list is selected.

As indicated by block 505, if there is no appropriate entry in the BF pool, the LB pool is interrogated to select a DSP. A DSP with a load indicated by the pointer 210 (i.e., a DSP with the lightest load) is selected as indicated by block 506. If there are multiple DSPs in an entry, any one of them can be selected at random; however, in the interest of speed, the first one in a list is selected.

As indicated by block 508, if there are no DSPs in the LB pool (that is if all the DSPs have been moved to the BF pool) the system looks in the BF pool for a DSP which has a higher allocation available than is required by the particular codec. If such an entry exists, a DSP from that resource group is selected as indicated by block 509.

As indicated by block 510, in some cases the system will be fully loaded and no DSP will be available to handle a call. In such a case an error or overflow indication will be given and if appropriate an operator may take some action.

Figure 6:
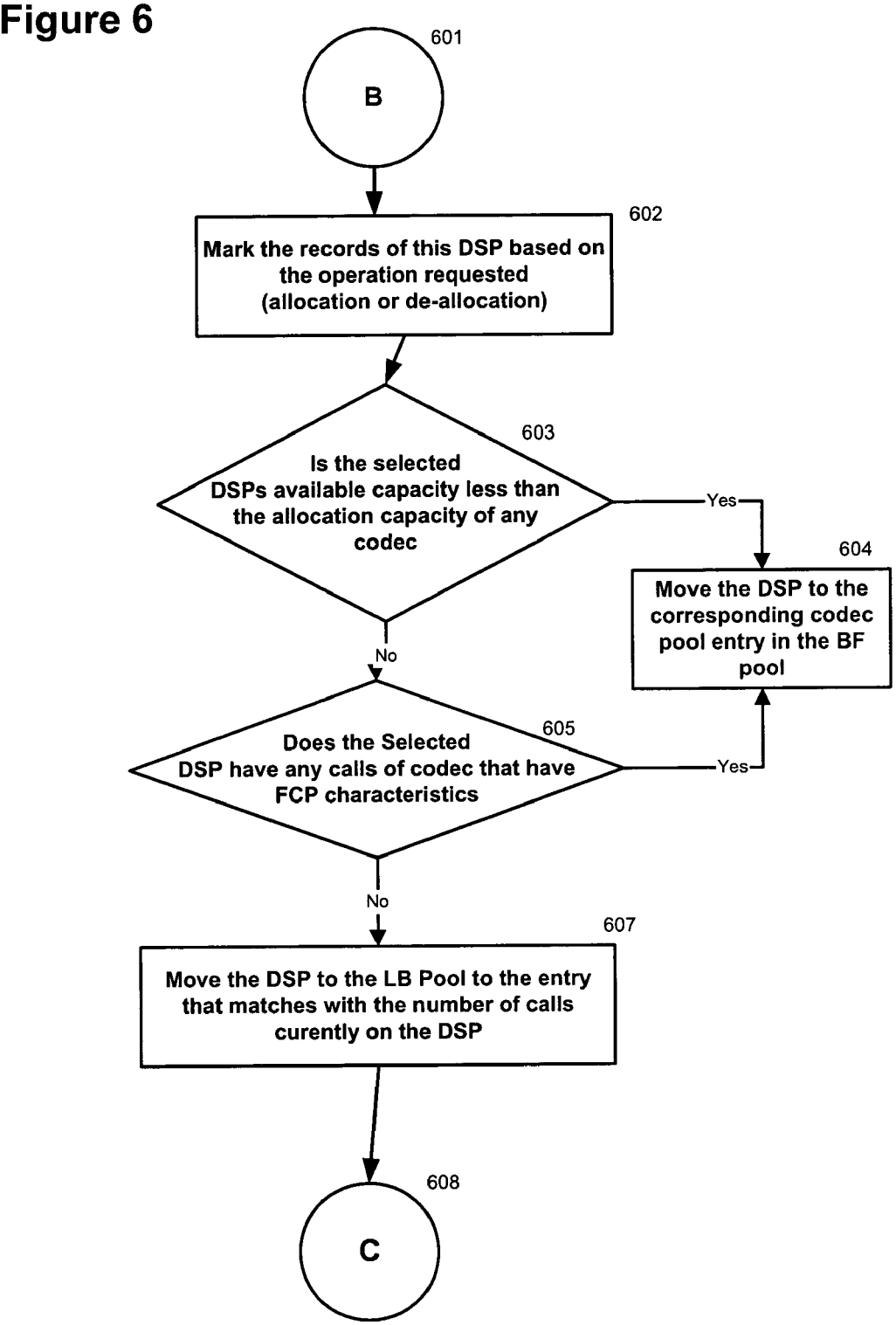
FIG. 6 is a block flow diagram showing how DSPs are moved into the pool.

When a DSP is selected as indicated by either blocks 504, 506 or 509 (block 507) the system goes on to the operation as indicated in FIG. 6 (block 601). Each DSP has an associated record. When the DSP is allocated (or de-allocated) the record for the particular DSP is so marked as indicated by block 602. The available capacity of the DSP is updated based on the operation (allocation or de-allocation). The record for each DSP includes information concerning the number of calls currently allocated to the DSP, the amount of resources used by each of these calls, and information concerning the FCP for any of the calls. This record is updated each time a call is allocated or de-allocated to a DSP.

As indicated by block 603, a determination is made as to whether or not the selected DSP has less remaining capacity than that required by any of the codec resource groups. If that is the case, the DSP is moved to the appropriate entry in the BF pool as indicated by block 604.

As previously indicated, the first time a particular DSP is set up to handle a particular codec, the DSP requires more resources than subsequent times the same DSP is set up to handle the same codec. Some of the set up routines can be used for subsequent instances of executing the same codec. This is a well known situation. It is referred to herein as FCP (first channel penalty).

As indicated by block 605, a check is made to determine if the particular DSP is executing any codecs that have FCP properties. If that is the case, the DSP is moved to the entry in the BF pool that corresponds to codecs with the particular FCP as indicated by block 604. If there are no FCP codecs on a DSP, the DSP is moved to the LB entry that matches the number of calls on that DSP. This is indicated by block 607. In this situation the system also proceeds to the operation shown on FIG. 7 (at block 701) as indicated by block 608.

Each time a call is allocated or de-allocated to a DSP, the position pointer in the DSP is moved if such a move is appropriate to indicate the group of DSP's which has the lightest load.

As indicated by block 702, a determination is made as to whether or not the current position in the LB pool is empty. If it is, no update of the LB pool is required as indicated by block 703.

If the position is not empty, the test indicated by block 705 is made. That is, a check is made to see if any DSPs have been moved into a position such that the position of the current pointer 210 needs to be moved. If that is not the case no update of the LB pool pointer is required as indicated by block 703. If that is the case, the position of the pointer in the LB pool is updated as indicated by block 706.

When a call ends, a de-allocation process takes place. The de-allocation process is not shown in the figures since it is simple and relatively conventional. When a call is ended the record for the DSP is updated and its position in the LB and BF pools is adjusted appropriately. For example, if a particular DSP is in the LB pool and it is handling four calls, when one of the calls is terminated, the DSP is moved from the four call to the three call group in the LB pool. If a DSP is in the BF pool and a call on the DSP ends, after the call ends there may be enough resources on the DSP that it can be moved to the LB pool. When a call being processed on a DSP ends, the appropriate position for that DSP in the BF or LB pool is evaluated in accordance with the previously explained criteria and the DSP is moved to the appropriate place in one of the pools.

It should be noted that when codecs are assigned to a codec resource group, there can be some range of resources utilization within which a codec will be assigned to a particular resource group. That is, all of the codecs assigned to one particular codec resource group in the best fit pool merely all need use substantially the same amount of DSP resources. They need not utilize exactly the same amount of resources. Thus as used herein the words "using the same amount of resources" should be interpreted as meaning "using substantially the same amount of resources."

It is noted that the particular embodiment shown herein, relates to the allocation of calls on a voice gateway; however, the same method and system could be used to allocate resources in other types of environments.

While the invention has been shown and described with respect to preferred embodiments thereof, it should be understood that other changes in form and detail can be made without departing from the spirit and scope of the invention. The scope of the invention is limited only by the appended claims.

We claim:

1. A system for allocating a plurality of DSPs to handle calls in a voice gateway, said calls utilizing a plurality of different codecs, said codecs requiring a plurality of different amounts of DSP resources, said system including:
   means for first determining if the call can be assigned to a DSP on a best fit basis utilizing a best fit pool which indicates the DSPs that would be fully loaded by a call using a codec in the associated resource group; and
   means, operable if a call can not be assigned on a best fit basis, for assigning the call to a DSP utilizing a load balancing pool which indicates the number of calls on each DSP.

2. A method of allocating a plurality of resources to handle tasks, said tasks utilizing a plurality of different amounts of resources, said method including:
   first determining if a task can be assigned to a resource on a best fit basis utilizing a best fit pool which indicates the resources that would be substantially fully loaded by a task in an associated resource group, the codecs in each resource group requiring substantially the same amount of resources; and
   if a task can not be assigned on a best fit basis, assigning the task to a resource utilizing a load balancing pool which indicates the number of tasks assigned to each resource.

3. A method of allocating tasks to a plurality of DSPs to handle calls in a voice gateway that receives calls, said calls utilizing a plurality of different codecs, at least some of said codecs requiring different amounts of DSP resources, said method including:
   establishing a best fit pool which has a number of codec resource groups, the codecs in each codec resource group utilizing the same amount of DSP resource, and for each particular resource group indicating which DSPs would be fully loaded if they were assigned a call using a codec in the particular resource group;
   establishing a load balancing pool that has a number of call load groups, the DSPs in each call load group handling a same number of calls;
   first determining if a particular call can be assigned to a DSP based on the information in the best fit pool; and
   if a call can not be assigned on a best fit basis, assigning said particular call on a load balancing basis using the information in said load balancing pool.

4. The method recited in claim 3 wherein said best fit pool also indicates for each particular resource group the DSPs that are executing calls that have a first channel penalty corresponding to the first channel penalty of the codecs in the particular resource group.

5. A system for allocating tasks to a plurality of DSPs to handle calls in a voice gateway that receives calls, said calls utilizing a plurality of different codecs, at least some of said codecs requiring different amounts of DSP resources, said system including:
   a best fit pool which has a number of codec resource groups, the codecs in each codec resource group utilizing the same amount of DSP resources to handle a call, and for each particular resource group indicating which DSPs would be fully loaded if they were assigned a call using a codec in the particular resource group;
   a load balancing pool which has a number of call load groups, the DSPs in each call load group handling the same number of calls;
   means for determining if a particular call can be assigned to a DSP based on the information in the best fit pool; and
   means, operable if a call can not be assigned on a best fit basis, for assigning said particular call on a load balancing basis using the information in said load balancing pool.

6. The system recited in claim 5 wherein said best fit pool also indicates for each particular resource group the DSPs that are executing calls that have a first channel penalty corresponding to the first channel penalty of the codecs in the particular resource group.

7. A computer readable medium having stored thereon sequences of instructions for allocating a plurality of resources to handle tasks, said tasks utilizing a plurality of different amounts of resources, said sequences of instructions including instructions for:
   first determining if a task can be assigned to a resource on a best fit basis utilizing a best fit pool which indicates the resources that would be substantially fully loaded by a task in the associated resource group, the codecs in each resource group requiring substantially the same amount of resources; and
   if the task can not be assigned on a best fit basis, assigning the task to a resource with a lightest load utilizing a load balancing pool which indicates the number of tasks assigned to each resource, wherein the resource with the lightest load is indicated by a pointer.

8. A computer readable medium having stored thereon sequences of instructions for allocating a plurality of resources to handle tasks as recited in claim 7 wherein said resource groups take into account which codecs have a same first channel penalty.

9. A computer readable medium having stored thereon sequences of instructions for allocating a plurality of resources to handle tasks as recited in claim 7 wherein said resources are codecs utilizing DSP resources.

10. A method of allocating tasks to a plurality of DSPs to handle calls in a voice gateway that receives calls, said calls utilizing a plurality of codecs, at least some of which utilize different amounts of DSP resources, said method including:
   first determining if a particular call can be assigned to a DSP on a best fit basis,
   if a call can not be assigned on a best fit basis, assigning said particular call on a load balancing basis so as to balance the load on the plurality of DSPs, wherein said calls are assigned on a load balancing basis using a load balancing pool, and wherein said load balancing pool has a number of call load groups, the DSPs in each call load group handling the same number of calls, and
   using a pointer to indicate one of the call load groups, wherein the one of the call load groups has DSPs having a lightest load, and wherein the assigning comprises assigning the particular call to the one of the call load groups.

11. The method recited in claim 10 further comprising, if a call can be assigned on a best fit basis, assigning said calls on a best fit basis using a best fit pool.

12. The method recited in claim 11 wherein said best fit pool has a number of codec resource groups, the codecs in each codec resource group utilizing the same amount of DSP resource, and for each particular resource group said pool indicates which DSPs would be fully loaded if they were assigned a call using a codec in the particular resource group.

13. The method recited in claim 12 wherein the codecs in each resource group have a same first channel penalty.

14. A system for allocating a plurality of DSPs to handle calls in a voice gateway that receives calls, said calls utilizing a plurality of codecs, at least some of said codecs requiring different amounts of DSP resources, said system including:
  means for first determining if a particular call can be assigned to a DSP on a best fit basis, and
  means, operable if a call can not be assigned on a best fit basis, for assigning the call on a load balance basis so as to balance the load on the plurality of DSPs, wherein said calls are assigned on a load balancing basis using a load balancing pool, wherein said load balancing pool has a number of call load groups, the DSPs in each call load group handling the same number of calls, and wherein DSPs in the call load having a lightest load, as indicated by a pointer, are assigned the particular call.

15. The system recited in claim 14 further comprising means, operable if a call can be assigned on a best fit basis, for assigning said calls on a best fit basis using a best fit pool.

16. The system recited in claim 15 wherein said best fit pool has a number of codec resource groups, the codecs in each codec resource group utilizing the same amount of DSP resource, and for each particular resource group said pool indicates which DSPs would be fully loaded if they were assigned a call using a codec in the particular resource group.

17. The system recited in claim 15 wherein the codecs in each resource group have a same first channel penalty.

18. A method allocating a plurality of DSPs to handle calls in a voice gateway, said calls utilizing a plurality of different codecs, said codecs requiring a plurality of different amounts of DSP resources, said method including:
  first determining if the call can be assigned to a DSP on a best fit basis utilizing a best fit pool which indicates the DSPs that would be fully loaded by a call using a codec in an associated resource group, the codecs in each resource group requiring substantially the same amount of resources; and
  if the call can not be assigned on a best fit basis, assigning the call to a DSP with a lightest load utilizing a load balancing pool which indicates the number of calls on each DSP, wherein the DSP with the lightest load is indicated by a pointer.

19. The method recited in claim 18 wherein said resource groups take into account which codecs have a same first channel penalty.

* * * * *

UNITED STATES PATENT AND TRADEMARK OFFICE
CERTIFICATE OF CORRECTION

PATENT NO. : 7,929,441 B1  
APPLICATION NO. : 10/645921  
DATED : April 19, 2011  
INVENTOR(S) : Sai Suresh Ganesamoorthi et al.

Page 1 of 1

It is certified that error appears in the above-identified patent and that said Letters Patent is hereby corrected as shown below:

IN THE SPECIFICATIONS:

Column 7, between lines 12 and 13, insert the paragraph -- Embodiments of the disclosed technology can include a computer-readable medium encoded with a computer program (e.g., computer-readable program code stored on the computer-readable medium), wherein the computer program, when executed in a system (e.g., a voice gateway system), can cause the system to perform certain steps (e.g., operations). --;

IN THE CLAIMS:

Column 10, line 10, claim 17, the word "15" should read -- 16 --.

Signed and Sealed this  
Twenty-eighth Day of February, 2012

David J. Kappos  
*Director of the United States Patent and Trademark Office*